Patented Oct. 30, 1923.

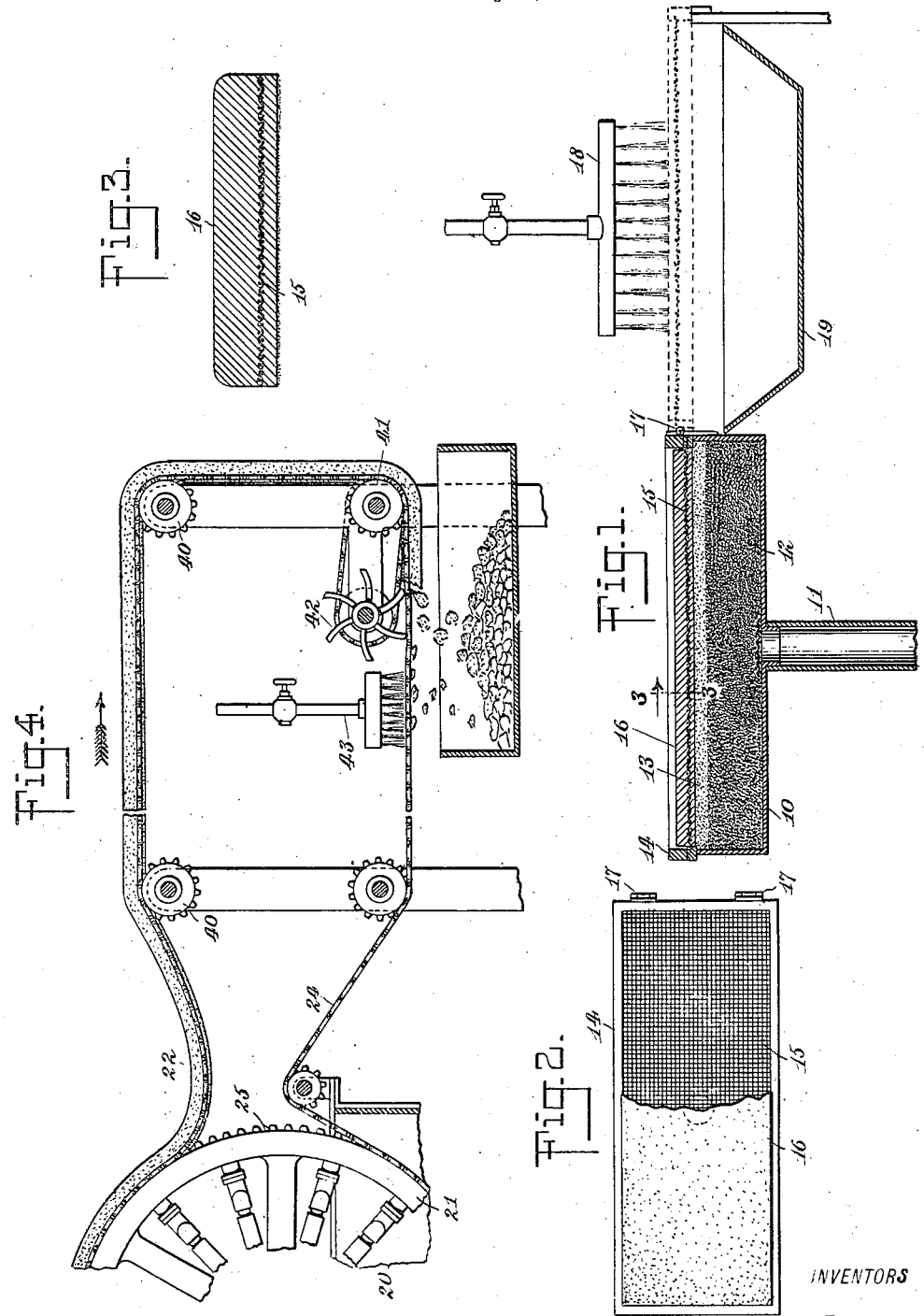

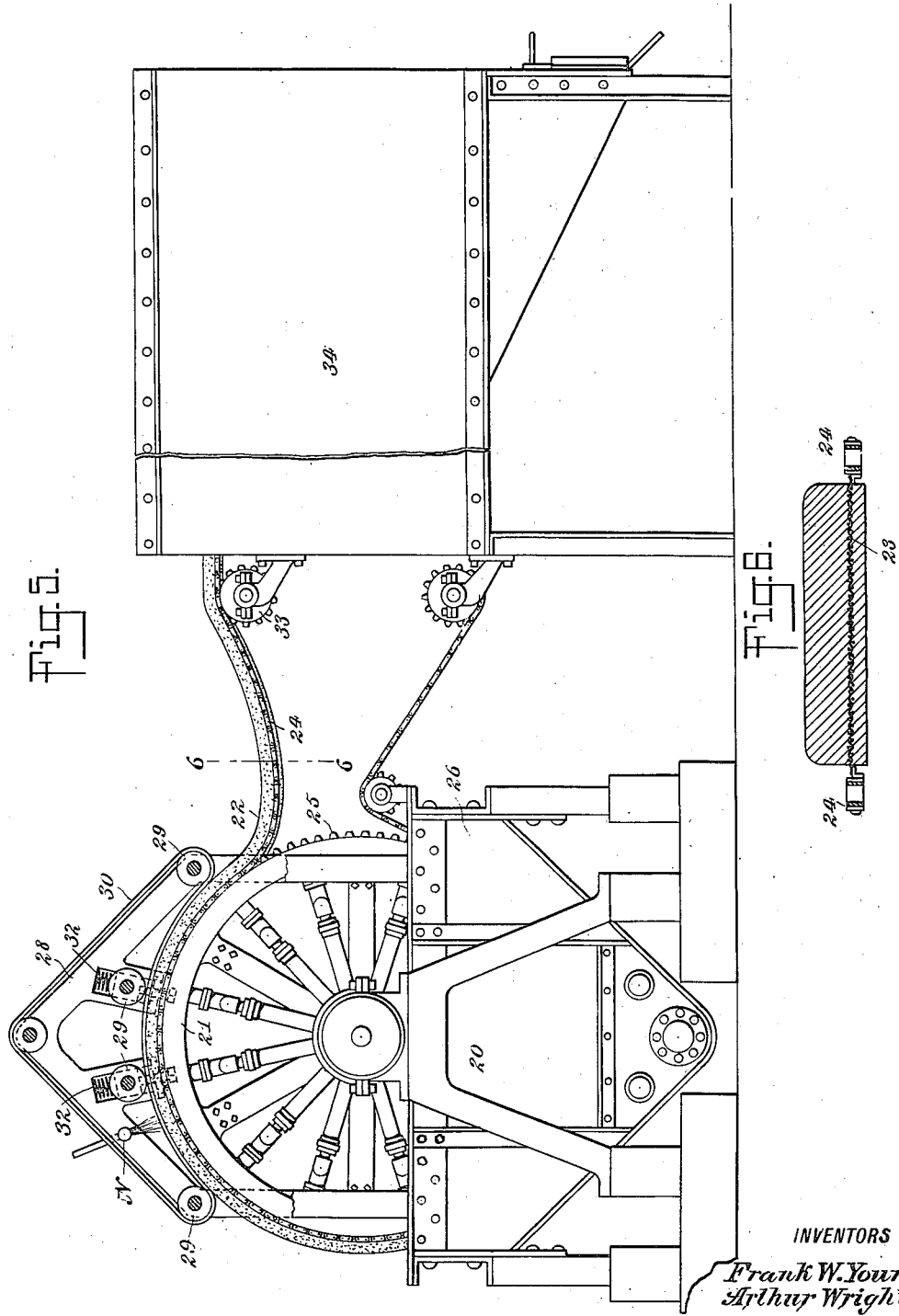

1,472,574

UNITED STATES PATENT OFFICE.

ARTHUR WRIGHT, OF UPPER MONTCLAIR, AND FRANK W. YOUNG, OF VERONA, NEW JERSEY.

FILTRATION.

Application filed July 3, 1920. Serial No. 393,951.

*To all whom it may concern:*

Be it known that we, ARTHUR WRIGHT, a citizen of the United States, and a resident of Upper Montclair, in the county of Essex and State of New Jersey, and FRANK W. YOUNG, a citizen of the United States, and a resident of Verona, in the county of Essex and State of New Jersey, have made and invented certain new and useful Improvements in Filtration, of which the following is a specification.

Our invention relates to the art of filtration and particularly to a process and apparatus for economically and effectually removing the filter cake from the filter and preserving it in a form in which it may be efficiently dried or otherwise treated.

At the present time it is a comparatively simple matter to pass a liquid, containing suspended particles, thru a filtering medium and thereby cause the separation of the suspended particles from the liquid. In some instances, however, it is a difficult matter to remove the filter cake from the filtering medium and it is always difficult to rapidly, efficiently and completely remove thin filter cakes from the filtering medium. Further, in removing any filter cake from the filtering medium, the filter cake is conglomerated, rendering its subsequent drying and handling a difficult matter.

It is accordingly an object of our invention to provide a process which will rapidly and efficiently, as well as economically and effectually, remove the filter cake from the filtering medium and, further, will maintain it substantially intact and transport it in its ribbon or sheet like form to any desired apparatus for its further treatment so that it may be readily dried, or in other ways treated and handled, according to the nature of the filter cake or filtration residues.

A further object of the present invention is to provide an apparatus for efficiently carrying out the above outlined process and attaining the aforementioned ends in a practical manner, thus materially advancing the art of filtration and reducing the difficulties and costs of filtering liquids.

With the foregoing and other objects in view our invention resides in the novel process and in the apparatus herein outlined and in the combination and arrangement of parts and details of construction hereinafter described and claimed.

The preferred embodiment of our invention and the apparatus for carrying out our improved process are disclosed in the accompanying drawings, wherein:

Figure 1 is a view in side section of a surface sand filter illustrating the characteristic features of our invention and disclosing the manner in which our improved filtration process may be carried out;

Figure 2 is a top plan view of the filtering box illustrating the manner in which the filter cake builds up upon the cake reinforcing and stripping member;

Figure 3 is a view in section taken on the line 3—3 of Figure 1;

Figure 4 is a view in side elevation and partially in section of a continuous filter and provided with our cake reinforcing and stripping medium which is in the form of an endless belt provided for the stripping of the cake from the filtering medium and conveying it to distant apparatus for its subsequent treatment;

Figure 5 is a view in side elevation of an apparatus similar to that disclosed in Figure 4 and equipped with means for more securely anchoring the cake to the reinforcing and stripping member;

Figure 6 is a view in section taken on the line 6—6 of Figure 5.

Referring to the several views wherein similar reference numerals designate corresponding parts throughout, and referring particularly to Figures 1 and 2 of the drawings, the filter is constructed along the lines of the ordinary surface sand filter and is composed of the filter box 10, outlet pipe 11, and is partially filled with coarse gravel 12 and above which is placed a layer of fine sand 13, the latter constituting the filtering medium. A frame 14 supports a wire screen 15 thereon and holds it adjacent the top surface of the fine sand 13 and accordingly in the cake-forming zone of the filtering medium 13. The screen 15 is composed of wire netting or may be made of any openwork or porous material which will act in a manner as hereinafter described, and in this connection it is to be understood that we do not limit ourselves to any particular construction or form of openwork member 15, as it will be apparent that a large number of different materials may be used to function in the manner as presently set forth.

The member 15 being located in the cake forming zone of the filtering medium 13, provides that as a cake is formed due to the passage of a liquid thru the filtering medium, it builds up and surrounds and embeds the openwork member 15 therein, so that the meshes or interstices of the openwork member reinforce the filter cake throughout and to a sufficient extent so that when the frame 14 is raised or moved about the hinges 17 the filter cake will be carried therewith and will remain intact during such procedure, thus allowing the filter cake to be readily, completely and effectually removed from the filtering medium. The openwork member 15 thus acts as a cake reinforcing and stripping member.

In carrying out our improved process it will be readily apparent that the filter cake, being reinforced by and adhering to the reinforcing and stripping member, may be readily conveyed or transported about, dried or in other ways treated, and due to the same being in its original and deposited form responds readily and efficiently to such treatment. In order to remove the filter cake from the reinforcing and stripping member the frame may be turned into the position illustrated in dotted lines in Figure 1, the spray nozzle 18 moved above and into alignment with the frame, and the cake forcibly washed from the reinforcing and stripping member, or the cake may be jarred directly from the reinforcing member, depending upon the characteristics of the liquid being filtered and the cake under treatment. With the filter cake thus forcibly removed from the reinforcing and stripping member the latter may be returned to its original position in the cake-forming zone of the filtering medium and the process repeated.

In order to apply our improved process to continuous filters we have provided the apparatus as illustrated in Figures 4 and 5, wherein a continuous rotary filter 20 is provided with a drum 21 and upon which is located any standard form or make of filtering medium (not shown) such as filtering cloth.

Referring specifically to Figure 5 it will be observed that we have provided the drum with a cake reinforcing and stripping member 22 in the form of a wire screen or porous netting 23 arranged in the form of an endless belt and held at its sides by the chains or links 24.

The drum 21 may be provided with suitable sprocket teeth 25 which engage the chains or links 24 and are adapted to move the reinforcing and stripping member as the filtering drum is rotated. The rotary filter 20, which is of standard construction, draws the slurry contained in the tank 26 thru the reinforcing and stripping member in an unobstructed manner, and the liquid thru the filtering medium, and into that portion of the rotary drum as is submerged in the slurry or liquor. The cake reinforcing and stripping member passes onto the drum just before its entrance in the slurry or liquor, and as the drum is rotated the cake builds up upon the filtering medium and accordingly contains the cake reinforcing and stripping member therein. In this connection it is to be noted that the reinforcing and stripping member may pass onto the drum after the latter has entered into the slurry or liquid, whereupon, a portion of the filter cake will build up prior to the introduction of the reinforcing and stripping member, should it be so desired. Further we wish to point out that the reinforcing and stripping member may be made without the links 24, and the drum without the sprocket teeth 25, depending upon the nature of the construction of the reinforcing and stripping member 22. Further, while the filter drum has been spoken of as driving the reinforcing and stripping member, it will be readily apparent that this may be changed and the reinforcing and stripping member may drive the filter drum, all of which features clearly come within the scope of our invention.

We would particularly call attention to the fact that by the terms "cake forming zone," we refer to that space immediately adjacent a filter medium in which the filter cake builds up, so that the term applies to a stationary filter as shown in Figure 1, or a rotary and continuous filter as illustrated in Figures 4 and 5, and the term "cake forming zone" is not intended to refer to any phase of a cycle of the rotary filter. In this regard it is to be understood that our reinforcing and stripping member may be introduced into the cake after it has been either partially or completely formed, should it be so desired, the same coming clearly within the scope of our invention, although, we have found that it is more practical and efficient to allow the reinforcing and stripping member to encircle the rotary filter and have the cake built up around the same.

In order to iron or compress the cake so as to squeeze out addition liquid from the cake, render it less porous and more homogeneous, and thus render more efficient the action of the reinforcing and stripping member, and in order to aid in washing the cake, we have provided the cake-compressing mechanism illustrated in Figure 5 wherein a framework 28 is mounted adjacent the upper and exposed portion of the rotary drum and supports the various rollers 29 around which extends the endless belt 30. The lower rollers are located along the arc of a circle concentric with the periphery of the rotating drum, so that as the cake, which is formed during the passage of a portion of the drum thru the liquid, passes upward it moves beneath and into contact with the endless belt 30. In order that the desired compression may be exerted upon the filter cake, suitable springs 32 are provided and press against the rollers and thus securely iron and compress the cake, rendering the same homogeneous and uniform and freeing it from considerable of the excess liquid and causing the cake to be securely bound in the interstices and meshes of the cake reinforcing and stripping member 22.

The cake compression mechanism also materially aids and facilitates the washing of the cake and to this end we have provided the spray nozzle N by means of which the endless belt 30 may be thoroughly drenched with water or other liquid which in turn flows thru the cake and in so doing washes the same and is drawn into the interior of the filter drum and properly disposed of. By reason of the endless belt being in contact with the cake a large stream of water may be played directly upon the belt so that the cake will be thoroughly drenched and washed and without danger of disrupting or prematurely discharging the cake from the filter drum. The endless belt is driven by the friction encountered by its contact with the cake and accordingly always travels at a speed equal to the peripheral speed of the surface of the cake so as to prevent any mutilation or rupture of the cake and providing for its proper ironing and compression.

The further movement of the drum causes the filter cake to occupy the position at which it is ordinarily scraped from the filtering medium and at which point the vacuum which has been drawing thru the cake to dry it, as in standard practice, is released. At this point the reinforcing and stripping member which as previously stated is in the form of an endless belt is led away from the drum and across the roller 33 and in the manner as previously described carries therewith the filter cake, the same being in the form of a thin strip and being spread over a wide area allows it to be efficiently treated within the interior of the apparatus 34. While we have illustrated this apparatus as being in the nature of a box it will be readily apparent that any desired apparatus may be utilized, according to the desired treatment of the filter cake, it being merely sufficient to point out that our process and apparatus provide a most efficient means of removing the cake from the filtering medium and conveying it to any desired point and maintaining it in its original state so that it may be efficiently and effectually treated.

As an illustration of the manner in which the cake may be conveyed to an apparatus for its subsequent removal reference is made to Figure 4 wherein the endless cake reinforcing and stripping member passes from the filtering drum to the two upper rolls or sprockets 40 and from thence down to the lower sprocket or roll 41, and at which locality it encounters a beater 42 adapted to forcibly strike and mechanically agitate the cake and the reinforcing screen or member and accordingly discharge the cake. In some instances it may be desirable to remove the cake by the action of a washer or spray and in such instances the nozzle 43 is utilized and forcibly removes the cake from the reinforcing and stripping member, this procedure being followed when the wet discharge of the cake is not objectionable.

From the foregoing it will be apparent that the cake reinforcing and stripping member does not in any way interfere with the passage of the liquid thru the filtering medium and in this respect our invention is to be clearly distinguished from those previous and impractical types of filtration apparatus wherein the filtering medium itself is in the form of an endless belt and the attempt to discharge the cake therefrom was unsuccessful as it has been found impractical, particularly, in the filtration of fine solids to prevent leakage between the filter medium, which is in the form of an endless belt, and the drum. Further the cake being located upon the surface only, of the belt like filter medium was not reinforced thereby and could not be efficiently handled. Our cake reinforcing and removing member is not a filter medium but acts as a cake reinforcement and having reinforced the cake acts as a stripper therefor and completely removes the cake from the filtering medium and preserves it intact, thus allowing the cake to be readily transported to such additional apparatus as may be needed for its subsequent treatment and having effected the complete removal of the cake renders the filtering medium again in condition for further filtration.

Further, it will be readily appreciated that the reinforcing and stripping member may be made of screen wire, cloth of widely separated threads or openwork mesh, and, in fact, of a large number of substances which will allow the filtering liquid to pass readily therethru and will reinforce and remove the cake from the filtering medium, as described.

From the foregoing it will be apparent that as the cake builds up on the rotary drum filter it will contain therein the reinforcing and stripping member 22, so that as the filter drum is rotated the reinforcing and stripping member, which is in the form of an endless belt, passes under the compression mechanism whereupon the cake is compressed, rendered homogeneous and less porous and accordingly more firmly anchored to the reinforcing and stripping member. Further considerable of the excess liquid will be removed from the cake and drawn into the drum as the vacuum is still maintained on the compartments directly under the compression apparatus. As the drum is further rotated and the particular portion of the filter cake, under discussion, approaches that point at which it is to be removed from the filter medium, the vacuum is relieved. The reinforcing and stripping member is at this point lead away from the filter medium and being embedded within the filter cake accordingly strips it from the filter medium and provides for its transportation to a suitable apparatus for its further treatment, usually of the nature of a drier through which it passes at a slow rate of speed. After the filter cake has been transported through suitable treating apparatus by the reinforcing and stripping member which is now acting as a conveyor it is forcibly dislodged from the same by a suitable beater or other apparatus 42.

It will thus be apparent that the member 22 acts in the capacity of a cake reinforcing and stripping member and having reinforced and stripped the cake from the filter medium, then acts as a conveyor for the same.

Having thus described and explained our invention, we claim and desire to secure by Letters Patent:

1. The filtration process, consisting in passing the liquid of a liquor containing suspended particles through a filter medium adjacent to which is located a cake reinforcing and stripping member, causing the cake to form on said filter medium and having the reinforcing and stripping member therein and then removing said reinforcing and stripping member from said filter medium and thereby causing the removal of the cake from said filter medium.

2. The filtration process consisting in introducing into the cake forming zone of a filter medium a cake reinforcing and stripping member, causing a cake to form on said filter medium and containing the reinforcing and stripping member therein and then removing said reinforcing and stripping member for the removal of said cake from said filter medium.

3. The filtration process consisting in filtering a liquid thru a filter medium having a reinforcing and stripping member located in the cake forming zone thereof and constructed in the form of an endless belt, moving said filter medium and the reinforcing and stripping member out of the liquid and then separating said filtering medium and the reinforcing and stripping member and causing the cake to accompany the reinforcing and stripping member.

4. The filtration process consisting in introducing a reinforcing and stripping member in the cake forming zone of a continuous rotary filter, causing a cake to form on said filter medium and embedding the reinforcing and stripping member therein and leading the reinforcing and stripping member away from the rotary filter to thereby strip the cake from the filter medium and cause the cake to accompany the reinforcing and stripping member.

5. The filtration process consisting in applying a reinforcing and stripping member to the cake forming zone of a continuous rotary filter, causing a cake to form on said filtering medium, ironing said cake, leading the reinforcing and stripping member away from the rotary filter to thereby cause the cake to accompany the reinforcing and stripping member and causing the reinforcing and stripping member to act as a conveyor for the subsequent handling and treatment of said cake.

6. The filtration process consisting in introducing a reinforcing and stripping member in the cake forming zone of a rotary filter, causing a cake to form on said filter medium, compressing said cake, leading the reinforcing and stripping member away from the rotary filter with the cake accompanying the reinforcing and stripping member and causing the reinforcing and stripping member to act as a conveyor for the subsequent handling and treatment of said cake.

7. The filtration process consisting in introducing into the cake forming zone of a filter medium and openwork endless belt member, causing a cake to form on said filter medium and containing the openwork endless belt member therein, leading the endless belt member away from said filter medium causing it to act as a cake reinforcing and stripping member for the removal of said cake from said filter medium, conveying the cake through suitable apparatus for its further treatment by said endless belt member and dislodging said cake from said endless belt member.

8. The filtration process consisting in causing a cake to form on a filter medium having an openwork endless belt member in the cake forming zone thereof leading said endless belt member away from the filter medium and causing it to act as a cake stripping member, a cake reinforcement member, and a conveyor for the stripped cake.

9. The filtration process consisting in causing a cake to form on a filter medium having an openwork endless belt member in the cake forming zone thereof, leading said endless belt member away from the filter medium and causing it to act as a cake stripping member, a cake reinforcement member and a conveyor for the stripped cake and dislodging said cake from the openwork endless belt member.

10. The filtration process consisting in introducing a reinforcing and stripping member into the cake forming zone of a filter, causing a cake to form on the filter medium and having the reinforcing and stripping member therein, compressing the cake by means of an endless belt applying a wash to the endless belt for washing the compressed cake therebeneath, conveying the reinforcing and stripping member away from said filter medium and causing it to reinforce and strip the cake from the filter medium and act as a conveyor therefor.

11. An apparatus of the class described comprising a filter medium and an openwork or porous member located in the cake forming zone of said filter medium and adapted to reinforce and aid in the stripping of the cake from the filter medium.

12. An apparatus of the class described comprising a filter medium and an openwork or porous non-filtering member located in the cake forming zone of said filter medium and adapted to become embedded in said cake, and means for moving said openwork member away from said filter medium to thereby strip the cake from the filter medium.

13. An apparatus of the class described comprising a rotary filter having a filter medium thereon, a cake reinforcing and stripping member extending along a portion of the filter medium and adapted to reinforce and strip the cake from the same.

14. An apparatus of the class described comprising a rotary filter including a filter medium, a cake reinforcing and stripping member adapted to become embedded in the cake, said reinforcing and stripping member extending away from the rotary filter and adapted to reinforce and strip the filter cake from the said filter medium and transport it away from the same.

15. An apparatus of the class described comprising a filter including a rotary drum with a filter medium thereon, an openwork member in the form of an endless belt extending around said drum and adapted to be contained within the filter cake as it builds up upon said filter medium, and means whereby said endless member is led away from said drum and adapted to convey the filter cake therewith.

16. An apparatus of the class described comprising a rotary filter including a drum having a filter medium thereon, a cake reinforcing and stripping member located in the cake forming zone thereof and means for compressing the cake in which the reinforcing and stripping member is contained.

17. An apparatus of the class described comprising a filter including a rotary drum, a cake reinforcing and stripping member constructed as an endless belt and extending around said drum, adapted to be embedded within the cake and to reinforce and strip it from said drum, means whereby said reinforcing and stripping member is adapted to convey said cake to the cake treating apparatus, and a cake compressing mechanism including an endless belt resiliently pressed against the cake when located upon the drum and containing the cake reinforcing and stripping member therein.

18. An apparatus of the class described comprising a rotary filter and having a filter medium thereon, and a cake reinforcing and stripping member constructed as an endless belt with a portion thereof located within the cake forming zone of said filter medium, said reinforcing and stripping member extending away from said filter medium and adapted to act as a conveyor for the stripped filter cake and means for removing the filter cake from said reinforcing and stripping member.

19. An apparatus of the class described comprising a rotary filter and having a filter medium thereon, and an openwork cake reinforcing and stripping member constructed as an endless belt with a portion thereof located within the cake forming zone of said filter medium, said reinforcing and stripping member extending away from said filter medium and adapted to act as a conveyor for the stripped filter cake and means for removing the filter cake from said reinforcing and stripping member, and a compression mechanism including an endless belt adapted to contact with the filter cake and to compress the same.

20. An apparatus of the class described comprising a rotary filter and having a filter medium thereon, and an openwork cake reinforcing and stripping member constructed as an endless belt with a portion thereof located within the cake forming zone of said filter medium, said reinforcing and stripping member extending away from said filter medium and adapted to act as a conveyor for the stripped filter cake and means for removing the filter cake from said reinforcing and stripping member, and a compression mechanism including an endless belt adapted to contact with the filter cake and to compress the same, and means for supplying a wash to the upper surface of the endless compression belt.

Signed at New York, borough of Manhattan, in the county of New York and State of New York, this 1st day of July, A. D. 1920.

ARTHUR WRIGHT.
FRANK W. YOUNG.

Witnesses:
A. M. LINDENSTRUTH,
ANNE V. WALSH.